(12) United States Patent
Schneider et al.

(10) Patent No.: US 12,410,797 B2
(45) Date of Patent: Sep. 9, 2025

(54) COMPRESSED AIR STATION

(71) Applicant: Kaeser Kompressoren SE, Coburg (DE)

(72) Inventors: Phil Andre Schneider, Coburg (DE); Klaus-Ulrich Kobelt, Coburg (DE)

(73) Assignee: KAESER KOMPRESSOREN SE, Coburg (DE)

(*) Notice: Subject to any disclaimer, the term of this patent is extended or adjusted under 35 U.S.C. 154(b) by 1005 days.

(21) Appl. No.: 17/598,550

(22) PCT Filed: Mar. 24, 2020

(86) PCT No.: PCT/EP2020/058088
§ 371 (c)(1),
(2) Date: Apr. 4, 2022

(87) PCT Pub. No.: WO2020/200906
PCT Pub. Date: Oct. 8, 2020

(65) Prior Publication Data
US 2022/0235773 A1    Jul. 28, 2022

(30) Foreign Application Priority Data

Mar. 29, 2019 (EP) ..................................... 19166316

(51) Int. Cl.
*F04D 27/00* (2006.01)
*B01D 53/26* (2006.01)
(Continued)

(52) U.S. Cl.
CPC ............ *F04C 29/04* (2013.01); *B01D 53/265* (2013.01); *F04C 18/16* (2013.01); *F04D 27/004* (2013.01);
(Continued)

(58) Field of Classification Search
CPC .......... F04D 15/0066; F04D 25/08–14; F04D 25/166; F04D 19/007; F04D 29/5806; F04D 29/5826
(Continued)

(56) References Cited

U.S. PATENT DOCUMENTS

2004/0244393 A1* 12/2004 Lucas ................. F04D 29/5826
62/470
2010/0232980 A1   9/2010 Tanaka et al.
2017/0097198 A1*  4/2017 Lamberson ............... F28B 9/06

FOREIGN PATENT DOCUMENTS

DE    102014000541 A1    7/2015
DE    102015012462 B3 *  3/2017 ............. F04D 25/08
(Continued)

OTHER PUBLICATIONS

International Search Report and Written Opinion for PCT/EP2020/058088 mailed Jul. 13, 2020, 13 pages.
(Continued)

*Primary Examiner* — Philip E Stimpert
(74) *Attorney, Agent, or Firm* — MYERS BIGEL, P.A.

(57) ABSTRACT

The application relates to a compressed air station comprising at least two compressed air components that yield waste heat, wherein each compressed air component is designed either as a compressor, in particular as a screw compressor, or as a refrigeration dryer, wherein at least one of the compressed air components, namely a refrigeration dryer (12), is connected to the exhaust air duct (13), and wherein a further compressed air component is connected to the same exhaust air duct (13), wherein a compressed air refrigeration heat exchanger (23) is provided within the refrigeration dryer (12), in which the compressed air is cooled by way of a refrigerant conducted in a refrigerant circuit (24), wherein
(Continued)

the refrigerant circuit (24) comprises a refrigerant compressor (25), a condenser (26), an expansion valve (27) and the compressed air refrigeration heat exchanger (23), wherein the compressed air station further comprises a dryer exhaust air duct (15), which is provided for discharging a cooling air flow that is conducted through the refrigeration dryer (12), and which connects a cooling air outlet (19) of the refrigeration dryer (12) to a refrigeration dryer connection (16) on the exhaust air duct (13), wherein the refrigeration dryer (12) has a fan (20) with a speed-adjustable fan motor (21), and the fan (20) is designed to convey the cooling air flow even against a backpressure currently prevailing in the exhaust air duct (13), wherein the refrigeration dryer (12) has a flow sensor (30) for detecting a respective current value for the cooling air volume flow $V_{act}$, and wherein the refrigeration dryer (12) has a controller (22) or interacts with a controller (22), which is configured and designed to record and process the data from the flow sensor (30) and to actuate the fan motor (21) of the fan (20) in such a way that, regardless of the current backpressure in the exhaust air duct (13), the respective current cooling air volume flow $V_{act}$ follows a setpoint for the cooling air volume flow $V_{soll}$.

22 Claims, 8 Drawing Sheets

(51) Int. Cl.
*F04C 18/16* (2006.01)
*F04C 29/04* (2006.01)

(52) U.S. Cl.
CPC .... *F04C 2240/81* (2013.01); *F04C 2270/195* (2013.01); *F04C 2270/585* (2013.01)

(58) Field of Classification Search
USPC ................................................ 417/44.2, 243
See application file for complete search history.

(56) References Cited

FOREIGN PATENT DOCUMENTS

| | | | |
|---|---|---|---|
| JP | H03178314 A | | 8/1991 |
| JP | H07189912 A | | 7/1995 |
| JP | H11262615 | * | 9/1999 |
| WO | WO-2018113275 A1 | * | 6/2018 |

OTHER PUBLICATIONS

First Chinese Office Action corresponding to CN 202080025667.0; Dated: Sep. 5, 2023, (15 pages, including English translation).

* cited by examiner

COMPRESSED AIR STATION

The invention relates to a compressed air station comprising at least two compressed air components that yield waste heat, wherein each compressed air component is designed either as a compressor, in particular as a screw compressor, or as a refrigeration dryer, and at least one exhaust air duct for discharging waste heat from a room.

A compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger. The waste heat produced by the compressor(s) is traditionally already discharged via one or more exhaust air ducts from a plant room in which the compressed air components are installed. In the case of refrigeration dryers, which usually produce a small amount of waste heat compared to the compressors present within a compressed air station, the waste heat has traditionally been either introduced into the plant room or conducted away via extraction hoods arranged above the refrigeration dryers. However, particularly when discharging the waste heat from the refrigeration dryer(s) into the plant room or even when this is conducted away only incompletely via an extraction hood arranged above the refrigeration dryers, the problem arises that the ambient air in the plant room heats up and the efficiency both of the compressors, in particular the screw compressors, and of the refrigeration dryers decreases.

In contrast, the object of the present invention is to propose a compressed air station and a corresponding method in which an improved discharging of waste heat from a plant room is made possible, including the waste heat from a refrigeration dryer present in the compressed air station.

This object is achieved in terms of the device by a compressed air station having the features of claim 1 and in terms of the method by a method for actuating the fan motor of a fan of a refrigeration dryer according to the features of claim 12. Advantageous further developments are specified in the dependent claims.

In terms of the device, the compressed air station is characterized in that it further comprises a dryer exhaust air duct, which is provided for discharging a cooling air flow that is conducted through the refrigeration dryer, and which connects a cooling air outlet of the refrigeration dryer to a refrigeration dryer connection on the exhaust air duct, wherein the refrigeration dryer has a fan with a speed-adjustable fan motor, and the fan is designed to convey the cooling air flow even against a backpressure currently prevailing in the exhaust air duct, wherein the refrigeration dryer has a flow sensor for detecting a respective current value for the cooling air volume flow $V_{act}$, and wherein the refrigeration dryer has a controller or interacts with a controller, which is configured and designed to record and process the data from the flow sensor and to actuate the fan motor of the fan in such a way that, regardless of the current backpressure in the exhaust air duct, the respective current cooling air volume flow $V_{act}$ follows a setpoint for the cooling air volume flow $V_{soll}$.

In terms of the method, it is proposed that the fan of a refrigeration dryer within a compressed air station is actuated in order to compensate for even a fluctuating backpressure within an exhaust air duct, which is also fed by at least one further compressed air component, the method being designed as follows:

A method for actuating the fan motor of a fan of a refrigeration dryer within a compressed air station, wherein the compressed air station comprises at least two compressed air components that yield waste heat, wherein each compressed air component is designed either as a compressor, in particular as a screw compressor, or as a refrigeration dryer, and at least one exhaust air duct for discharging waste heat from a room, wherein at least one of the compressed air components, namely a refrigeration dryer, is connected to the exhaust air duct, and wherein a further compressed air component is connected to the same exhaust air duct, wherein a compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger, wherein the compressed air station further comprises a dryer exhaust air duct, which is provided for discharging a cooling air flow that is conducted through the refrigeration dryer, and which connects a cooling air outlet of the refrigeration dryer to a refrigeration dryer connection on the exhaust air duct, wherein the refrigeration dryer has a fan with a speed-adjustable fan motor, and the fan is designed to convey the cooling air flow even against a backpressure currently prevailing in the exhaust air duct, wherein the method comprises the following steps:

specifying a setpoint $V_{soll}$ for the cooling air volume flow,
detecting a respective current value for the cooling air volume flow $V_{act}$, and
actuating the fan motor (21) of the fan (20) in such a way that the respective current cooling air volume flow $V_{act}$ follows the respectively specified setpoint for the cooling air volume flow $V_{soll}$.

One core consideration of the present invention is that of controlling the fan motor of the fan in the refrigeration dryer in such a way that a residual pressure of the exhaust air flow from the refrigeration dryer is adjusted to the pressure level of an exhaust air duct system used jointly with at least one screw compressor. The speed of the fan motor of the fan is therefore varied such that the amount of exhaust air from the refrigeration dryer per unit of time, i.e. the cooling air volume flow of the refrigeration dryer, remains unchanged regardless of the current backpressure in the exhaust air duct.

The condensation pressure and the cooling capacity of the refrigeration dryer can thus be kept at the same level regardless of the current backpressure, wherein it remains possible for the condensation pressure or the cooling capacity to vary according to other criteria, but the current backpressure in the exhaust air duct or in the exhaust air duct system has no influence on the condensation pressure or the cooling capacity of the refrigeration dryer. A current residual pressure will be understood here to mean the current pressure reserve of the fan for overcoming additional flow resistances, such as that of an exhaust air duct for example. The maximum achievable residual pressure of the fan used in the refrigeration dryer is to be regarded as sufficient if the backpressure, as results from the interaction with other components, such as a connected screw compressor, and the additional flow resistances, as occur inter alia in an exhaust air duct of customary length, can be overcome.

Although, with regard to the refrigerant circuit, mention is made of a condenser on the one hand and an expansion valve on the other hand, it is clarified that the refrigerant circuit need not necessarily be operated with a phase transition of gas-liquid liquid-gas, but rather in the case of certain refrigerants is also operated via transcritical processes, such as for example in the case of $CO_2$ (R-744). There is then no liquefaction, but rather heat is output on the high-pressure side of the refrigerant circuit and the gas phase is retained. The gas cooler outlet temperature is then to be seen as a value equivalent to the condensation temperature.

A speed-adjustable fan motor in the sense of the invention will be understood to be a fan motor that can be adjusted with regard to its speed, in particular by frequency reversal or by phase control.

In the present application, the cooling air flow conducted through the refrigeration dryer is referred to as the cooling air flow per se. Where the cooling air volume flow is mentioned, this refers to the quantitative value as a volume flow, for example expressed in the unit $m^3/s$, i.e. the volume of cooling air transported by the cooling air flow per period of time.

In a preferred embodiment of the present invention, the flow sensor is designed as a differential pressure sensor.

In a preferred embodiment of the compressed air station proposed here, the fan of the refrigeration dryer is thus also designed as a radial fan. Admittedly, traditionally used axial fans have a lower power consumption at the nominal point and thus initially appear more favourable from an energy point of view. However, this applies particularly in connection with traditionally used refrigeration dryers, which blow out their waste heat directly into a plant room in which they are installed. Radial fans appear more suitable for direct connection to an exhaust air duct or to an exhaust air duct system since they are able to ensure a higher residual pressure.

In a further preferred embodiment, it is provided that a screw compressor and the refrigeration dryer are connected to one another via a compressed air line, and the compressed air line is designed to transfer the compressed air output by the screw compressor to the refrigeration dryer for drying purposes, wherein a cooling air outlet of the screw compressor is connected via a compressor connection to the exhaust air duct, to which the refrigeration dryer is also connected. In this possible embodiment, the screw compressor and the refrigeration dryer convey their waste heat via corresponding cooling air outlets to the same exhaust air duct. At the same time, the compressed air output by the screw compressor is transferred to the refrigeration dryer for drying purposes. However, it is also conceivable that, although the compressed air generated by the screw compressor is transferred to the refrigeration dryer, the screw compressor and the refrigeration dryer output their waste heat to different exhaust air ducts.

In the compressed air station proposed here, one or more oil-injected screw compressors and/or one or more oil-free compressors may be used.

In a preferred embodiment of the compressed air station proposed here, the controller interacts with an ambient air sensor, preferably a temperature sensor, for detecting a value representative of the state of the supply air, in particular a value representative of the supply air temperature, and transmitting it to the controller.

In a possible embodiment of the present invention, two or more screw compressors and/or two or more refrigeration dryers are connected to a common exhaust air duct. Particularly large pressure fluctuations or pressure differences may occur in a common exhaust air duct used in this way, and therefore an adjustment of the fan motor of the fan of the refrigeration dryer, as proposed in the context of the present invention, is particularly important.

In a preferred embodiment, the setpoint for the cooling air volume flow $V_{soll}$ results from a design value for the cooling air volume flow $V_{nenn}$, which is specific to the given refrigerant circuit with the given refrigerant compressor, according to the following formula:

$$V_{soll} = V_{nenn} * F_{Hub/KMK} * F_T,$$

where the factors $F_{Hub/KMK}$ and $F_T$ are correction factors, each of which can alternatively be set to 1 or to a value between 0 and 1.

In a preferred embodiment, an exhaust air damper is arranged in the dryer exhaust air duct, which damper is designed and configured to close the dryer exhaust air duct when the refrigerant compressor is idle. This prevents the exhaust air from flowing back into a plant room in which the refrigeration dryer is installed.

In this case, in a preferred embodiment, the exhaust air damper may be designed as a gravity-operated exhaust air damper, which opens whenever the fan is conveying the exhaust air through the dryer exhaust air duct and closes whenever the fan is idle.

In an alternatively possible embodiment, the exhaust air damper may interact with a drive motor, wherein the drive motor is actuated by the controller in such a way that the exhaust air damper is opened or closed depending on the operating state of the fan. In particular, the exhaust air damper is or will be opened when the fan is operating. The exhaust air damper is or will be closed in particular when the fan is idle.

In a specific further development of the proposed method, the respective current value for the cooling air volume flow $V_{act}$ is detected by way of a differential pressure measurement. A differential pressure measurement is a relatively simple and at the same time reliable measurement method for determining with sufficient certainty a current value for the cooling air volume flow $V_{act}$.

In a preferred embodiment, the preferred differential pressure measurement is performed immediately before the cooling air flow flows into the fan. In other words, the pressure is detected in the region immediately before the air flow flows into the fan and is compared with a reference pressure. Such a reference pressure may be provided for example between the condenser and the fan. As already mentioned above, this is a particularly favourable position within the course of the cooling air flow for performing a differential pressure measurement.

In a possible embodiment, the setpoint for the cooling air volume flow may be adapted as a function of the load state of the refrigerant compressor and/or as a function of the ambient temperature. If the cooling air volume flow is adapted as a function of the load state of the refrigerant compressor, in the case of just one refrigerant compressor for example the usage state of one, possibly frequency-controlled, refrigerant compressor is to be taken into account. If a plurality of refrigerant circuits are operated in parallel with one another in a plant, the load state may also include for example the extent to which each refrigerant compressor is loaded.

In a preferred embodiment of the present method, the setpoint for the cooling air volume flow $V_{soll}$ results from a design value for the cooling air volume flow $V_{nenn}$, which is specified for the refrigerant circuit and the refrigerant compressors installed therein.

In a further preferred exemplary embodiment, the setpoint for the cooling air volume flow $V_{soll}$ results from a design value for the cooling air volume flow $V_{nenn}$, which is specified for the refrigerant circuit and the refrigerant compressors installed therein, taking into account one or more correction factors F.

In a specifically preferred embodiment of the present method, the setpoint for the cooling air volume flow $V_{soll}$ results from the design-based nominal value for the cooling air volume flow $V_{nenn}$, according to the following formula: $V_{soll}=V_{nenn}*F_{Hub/KMK}*F_T$, where $F_{Hub/KMK}$ is a correction factor for taking into account the respective current stroke volume in the refrigerant circuit, and $F_T$ is a correction factor for taking into account temperature fluctuations in the supply air of the cooling air flow, where: $0 \leq F_{Hub/KMK} \leq 1$ and $0 \leq F_T \leq 1$. Therefore, $V_{soll}$ results directly from $V_{nenn}$, with one or more correction factors being used in certain operating situations and/or under certain operating conditions, which correction factors ensure that $V_{soll}$ is reduced in comparison to $V_{nenn}$. $V_{soll}$ can thus be a certain percentage between 0 and 100% of $V_{nenn}$.

In a further preferred embodiment, a correction factor $F_T$ takes into account a current value of the supply air temperature, wherein the value $F_T$ is set to 1 in the case of supply air temperatures above a limit temperature $T_{0,amb}$, and $0 \leq F_T < 1$ applies only in the case of cooling air inlet temperature values $T < T_{0,amb}$. In a very specifically preferred embodiment, the correction factor $F_T$ for the temperature T of the supply air (cooling air inlet temperature) in ranges below the limit temperature $T_{0,amb}$ can be calculated as follows:

$$T_{0,amb} = \frac{\Delta T}{T_{0,amb} - T_{amb,act}},$$

where $\Delta_T$ denotes a dryer-specific supplement in ° C., $T_{0,amb}$ denotes a fixed limit temperature, and $T_{amb,act}$ denotes the current supply air temperature.

In a further preferred embodiment, the correction factor $F_{Hub/KMK}$ can be formed from a ratio of the current stroke volume and of the maximum stroke volume in the refrigerant circuit, according to the following formula $$F_{Hub/KMK} = \frac{\text{current stroke volume } KMK}{\text{maximum stroke volume } KMK}$$

By way of the correction factor $F_{HUb/KMK}$, therefore, it is possible to take into account operating situations in which the current stroke volume KMK is reduced in comparison to a maximum stroke volume KMK for which the refrigerant circuit is designed. This may be achieved for example in that, if using multiple refrigerant compressors, one or more fluid compressors are switched off or, if using one refrigerant compressor with an adjustable output, the output of the refrigerant compressor is currently reduced.

In a specifically preferred embodiment of the method according to the invention, a PID controller, a PI controller, a deadband controller or a three-point controller may be used to actuate the fan motor of the fan in order to bring the current cooling air flow $V_{act}$ towards the setpoint for the cooling air volume flow $V_{soll}$, wherein a control deviation e results from $V_{soll}-V_{act}$, and wherein $V_{soll}$ denotes the setpoint for the cooling air volume flow and $V_{act}$ denotes the current cooling air volume flow.

The invention will be explained in greater detail below, including with regard to further features and advantages, based on the description of exemplary embodiments and with reference to the following drawings, in which.

Figure 1:
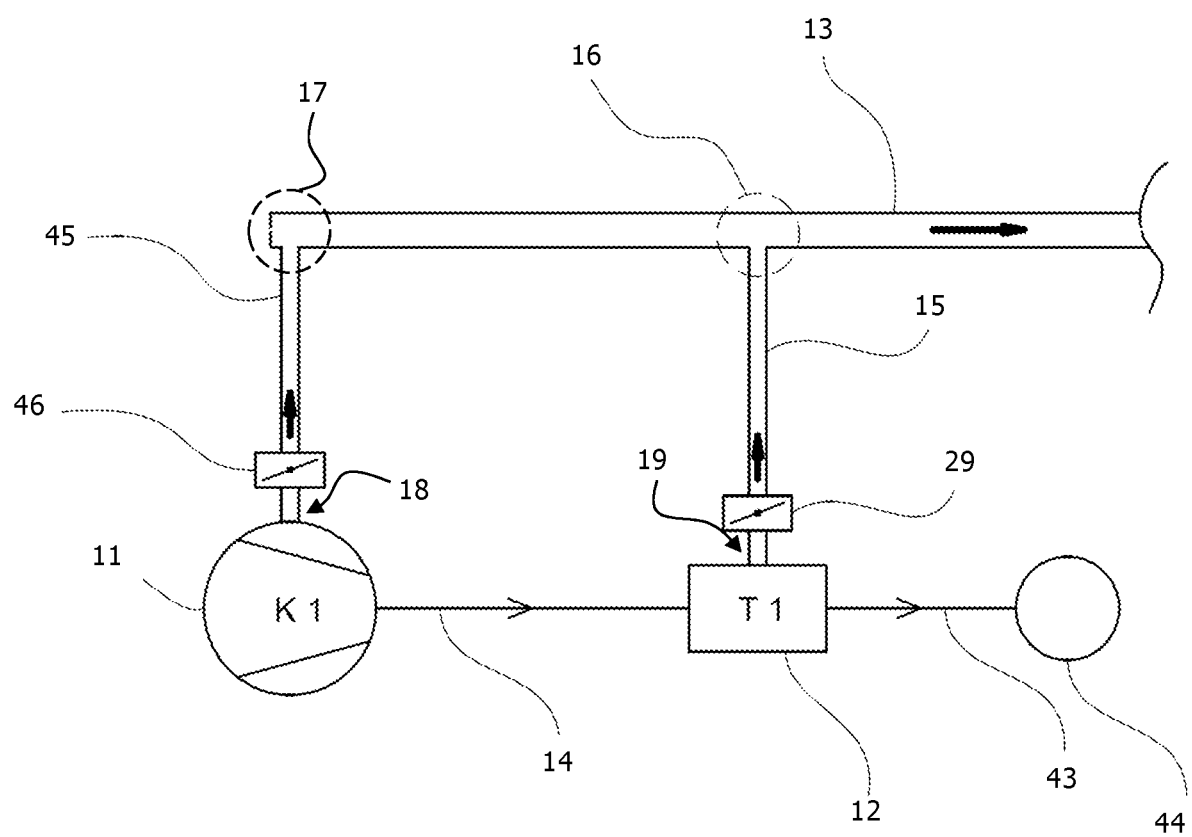
FIG. 1 shows an exemplary embodiment of a compressed air station according to the invention, in a schematic illustration.

FIG. 1 shows an exemplary embodiment of a compressed air station according to the invention, in which, as compressed air components, a screw compressor 11 and a refrigeration dryer 12 are connected to a common exhaust air duct 13. The screw compressor 11 supplies compressed air via a compressed air line 14 to the refrigeration dryer 12. Via a further compressed air line 43, the compressed air dried in the refrigeration dryer 12 is supplied to a consumer 44. Instead of one consumer, a plurality, in particular a large number, of consumers may also be supplied with compressed air through the further compressed air line 43 via a compressed air network.

The screw compressor 11 and the refrigeration dryer 12 produce waste heat, which according to the invention is discharged via the common exhaust air duct 13 by way of corresponding cooling air flows. A screw compressor exhaust air duct 45 forms the first section of a common exhaust air duct 13, to which the refrigeration dryer 12 is also connected further downstream via a dryer exhaust air duct 15. Specifically, the screw compressor 11 has a cooling air outlet 18, to which the screw compressor exhaust air duct 45 is directly connected. The refrigeration dryer 12 likewise has a cooling air outlet 19, to which the dryer exhaust air duct 15 is directly connected, namely preferably in such a way that only the cooling air or the waste heat of the refrigeration dryer 12 is discharged and no mixing takes place with ambient air not conducted via the refrigeration dryer 12.

The dryer exhaust air duct 15 is connected to the common exhaust air duct 13 at the aforementioned refrigeration dryer connection 16. In addition, an exhaust air damper 29 is arranged between the refrigeration dryer 12 and the refrigeration dryer connection 16 on the exhaust air duct 13, in particular within the dryer exhaust air duct 15, by means of which damper the dryer exhaust air duct 15 can be closed.

A further exhaust air damper 46 may also be arranged between the screw compressor 11, i.e. between the cooling air outlet 18 of the screw compressor 11 and the refrigeration dryer connection 16, in particular within the screw compressor exhaust air duct 45. As passive backflow dampers, the exhaust air damper 29 of the refrigeration dryer and/or the exhaust air damper 46 of the screw compressor can either be opened using a sufficient flow in the conveying direction or closed under the effect of gravity. However, it is also possible (see illustration in FIG. 6) to open and close the exhaust air damper 29 by means of a drive motor 39. Of course, the exhaust air damper 46 of the screw compressor can also be opened and closed by means of a drive motor (not shown).

Figure 2:
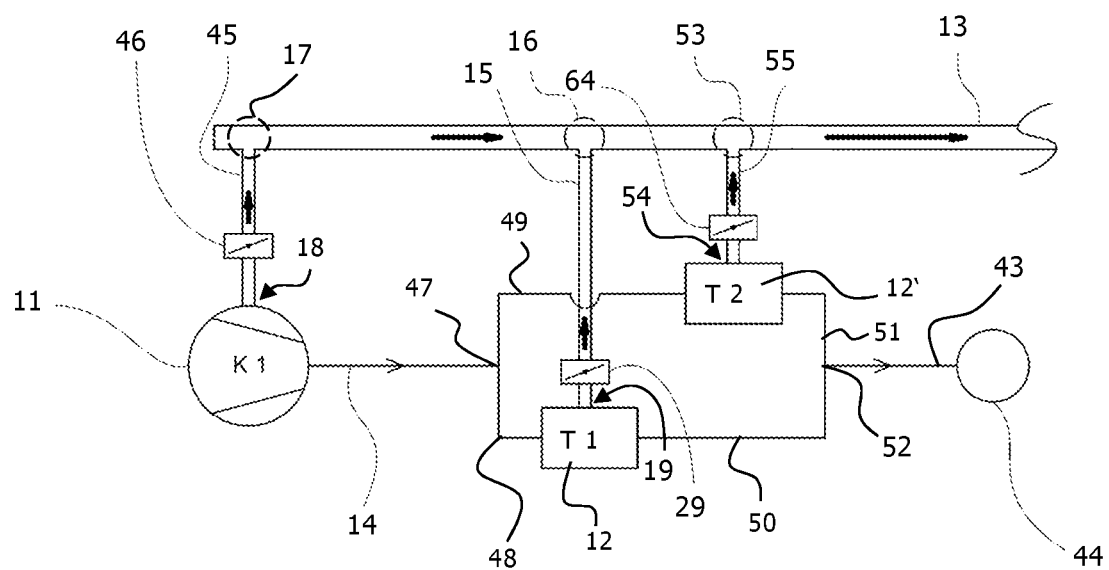
FIG. 2 shows an embodiment of a compressed air station according to the invention, modified in comparison to the embodiment shown in FIG. 1, in a schematic illustration.

FIG. 2 shows an embodiment of a compressed air station according to the invention, modified in comparison to the embodiment shown in FIG. 1, in which, as compressed air components, a screw compressor 11 and a first refrigeration dryer 12 and also a further refrigeration dryer 12' are connected to a common exhaust air duct 13. In this embodiment, the compressed air transferred from the screw compressor to the compressed air line 14 is split at a branching point 47 into a first partial line 48 and a second partial line 49.

The first refrigeration dryer 12 is arranged in the first partial line 48, and the second refrigeration dryer 12' is arranged in the second partial line 49. The dried compressed air leaves the first refrigeration dryer 12 via a third partial line 50. The dried compressed air that flows via the second partial line 49 into the second refrigeration dryer 12' and is dried therein leaves the refrigeration dryer 12' via a fourth partial line 51. The third partial line 50 and the fourth partial line 51 are brought together at a joining point 52 and merge into the compressed air line 43, which conducts the compressed air to at least one consumer 44.

The screw compressor 11, the refrigeration dryer 12 and the refrigeration dryer 12' each direct their cooling air flows into a common exhaust air duct 13. To this end, the screw compressor 11 is connected to the exhaust air duct 13 in the manner already described with reference to the embodiment shown in FIG. 1. The first refrigeration dryer 12 is also connected to the common exhaust air duct 13, in the manner already described with reference to the embodiment shown in FIG. 1, in order to transfer the cooling air or waste heat output from the cooling air outlet 19. Downstream of the refrigeration dryer connection 16, which is assigned to the first refrigeration dryer 12, a second refrigeration dryer connection 53 is provided on the exhaust air duct 13, at which the cooling air of the second refrigeration dryer 12' is also introduced downstream into the exhaust air duct 13. To this end, a cooling air outlet 54 of the second refrigeration dryer is connected to a dryer exhaust air duct 55, which connects the cooling air outlet 54 of the second refrigeration dryer 12' to the refrigeration dryer connection 53 on the exhaust air duct 13, so that the cooling air also of the second refrigeration dryer is discharged without any ambient air not conducted via the second refrigeration dryer 12'. Also in this dryer exhaust air duct assigned to the second refrigeration dryer 12', an exhaust air damper 64 is provided so as to be able to close the exhaust air duct 55, in particular when the second refrigeration dryer 12' is idle.

Figure 3:
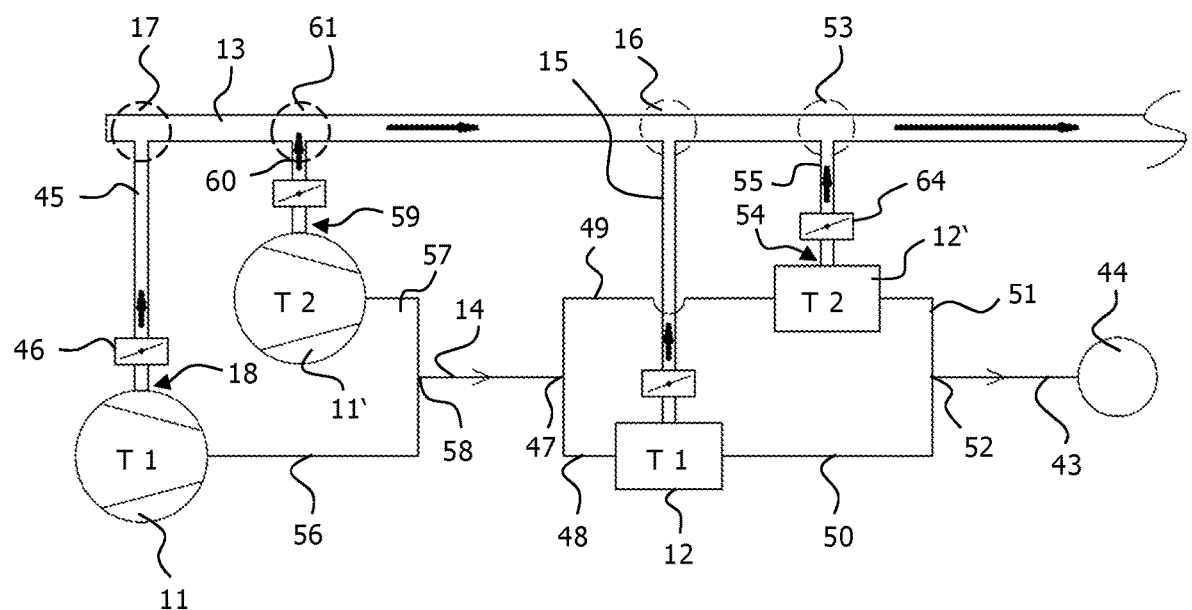
FIG. 3 shows an embodiment of a compressed air station, once again modified in comparison to FIGS. 1 and 2, in a schematic illustration.

FIG. 3 shows an embodiment of a compressed air station, once again modified in comparison to the embodiments shown in FIG. 1 and FIG. 2, in which, as compressed air components, a first screw compressor 11, a second screw compressor 11', a first refrigeration dryer 12 and a second refrigeration dryer 12' are connected to a common exhaust air duct 13. In the embodiment of a compressed air station illustrated in FIG. 3, two screw compressors are provided, namely the first screw compressor 11 and the second screw compressor 11', which operate in parallel with one another with regard to compressed air generation, i.e. the screw compressor 11 outputs compressed air on a first output line 56 and the screw compressor 11' outputs compressed air on a second output line 57. At a joining point 58, the first output line 56 and the second output line 57 join to form a common compressed air line 14. From the compressed air line 14, the compressed air is conducted at a branching point 47 to a first partial line 48 and to a second partial line 49, in which a respective refrigeration dryer 12 or 12' is connected. The compressed air is thus dried by the two refrigeration dryers 12, 12' in parallel, so that the arrangement of the two refrigeration dryers corresponds exactly to the arrangement of the two refrigeration dryers according to the embodiment shown in FIG. 2. The discharging of the cooling air or waste heat via dryer exhaust air duct 15 or dryer exhaust air duct 55 also takes place exactly as in the arrangement shown in FIG. 2.

In manner differing from the arrangement shown in FIG. 2, however, in the embodiment shown in FIG. 3 not only are two refrigeration dryers 12, 12' connected to the common exhaust air duct 13, but also the aforementioned two screw compressors 11, 11'. The first screw compressor 11 is connected to the common exhaust air duct 13 in the manner already described with reference to FIGS. 1 and 2 and represents the component yielding waste heat that is arranged furthest upstream in relation to the flow direction of the exhaust air duct 13. The screw compressor 11 is therefore the waste heat supplier placed most upstream within the common exhaust air duct 13.

The aforementioned second screw compressor 11' has a cooling air outlet 59, by which it is connected to a screw compressor exhaust air duct 60. The screw compressor exhaust air duct 60 connects the cooling air outlet 59 of the second screw compressor 11' to a compressor connection 61, at which the screw compressor exhaust air duct 60 is connected to the common exhaust air duct 13, namely at a section between the compressor connection 17 of the first screw compressor 11 and the refrigeration dryer connection 16 of the first refrigeration dryer 12 or the second refrigeration dryer connection 53 of the refrigeration dryer 12'.

Figure 4:
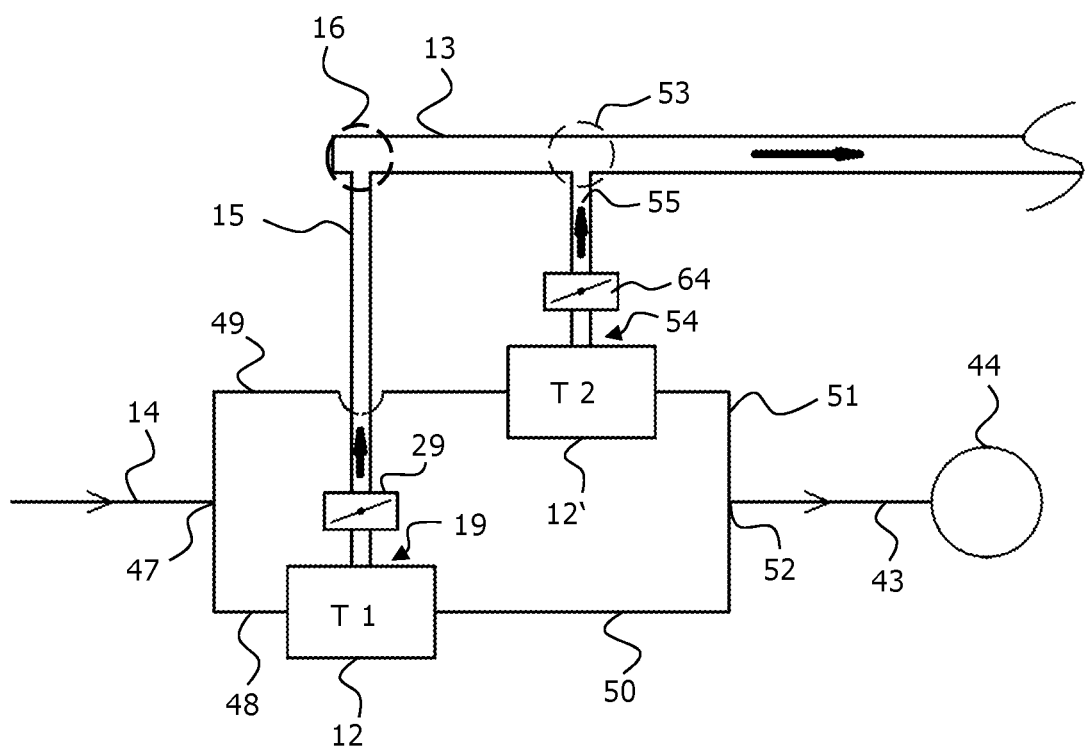
FIG. 4 shows an embodiment of a compressed air station, once again modified in comparison to FIGS. 1 to 3, in a schematic illustration.

FIG. 4 illustrates an embodiment that has once again been modified, in which, as compressed air components, a first refrigeration dryer 12 and a second refrigeration dryer 12' are connected to a common exhaust air duct 13. In this case, therefore, a common exhaust air duct 13 is not fed by one refrigeration dryer 12 and one screw compressor 11, but rather by two refrigeration dryers 12, 12'. The connection of the refrigeration dryers 12, 12' corresponds to the connection of the refrigeration dryers 12, 12' in the arrangement of the embodiment shown in FIG. 3, with the sole exception that no cooling air or waste heat from a screw compressor 11, 11' is introduced upstream of the connection points where the refrigeration dryers 12, 12' are connected to the common exhaust air duct 13.

Figure 5:
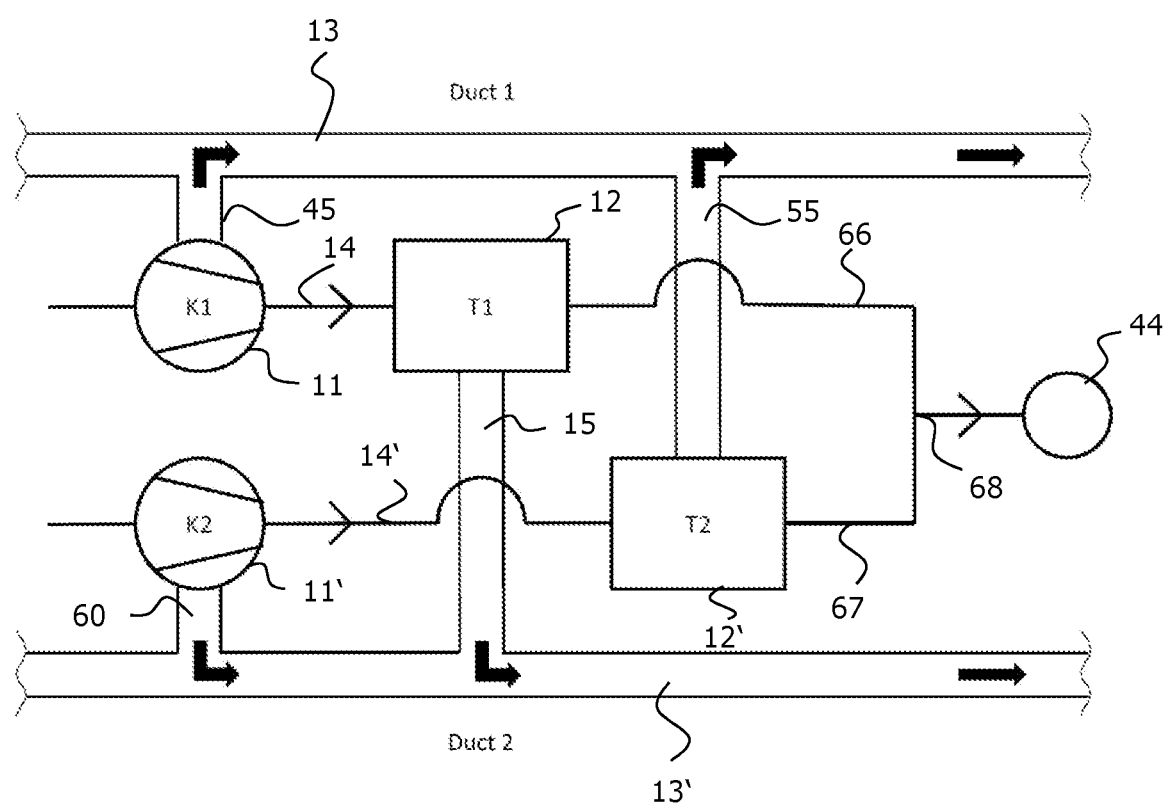
FIG. 5 shows an embodiment of a compressed air station, once again modified in comparison to FIGS. 1 to 4, in a schematic illustration.

FIG. 5 illustrates an embodiment that has once again been modified, in which, as compressed air components, a first screw compressor 11 discharges waste heat into a first exhaust air duct 13 via a screw compressor exhaust air duct 45. The screw compressor 11 supplies compressed air via a compressed air line 14 to a first refrigeration dryer 12. The compressed air dried in the refrigeration dryer 12 is conducted via a first output line 66 to a joining point 68, to which compressed air dried in a second refrigeration dryer 12' is also conducted via a second output line 67. From the joining point 68, the combined dried compressed air is fed to a consumer 44.

A second screw compressor 11' generates compressed air and transfers this compressed air via the compressed air line 14' to the aforementioned second refrigeration dryer 12'. Waste heat from the second screw compressor 11' is supplied via a screw compressor exhaust air duct 60 to a second exhaust air duct 13', which is separate from the exhaust air duct 13. Waste heat from the first refrigeration dryer 12 is also discharged into this second exhaust air duct 13' via a dryer exhaust air duct 15. The second refrigeration dryer 12', which in terms of compressed air is connected to the second screw compressor 11', in contrast feeds its exhaust air via a dryer exhaust air duct 55 to the exhaust air duct 13, which is also fed by the first screw compressor 11. Here, therefore, the pairs of screw compressors and refrigeration dryers connected one behind the other are connected to two different exhaust air ducts 13, 13' in a crossed fashion.

Figure 6:
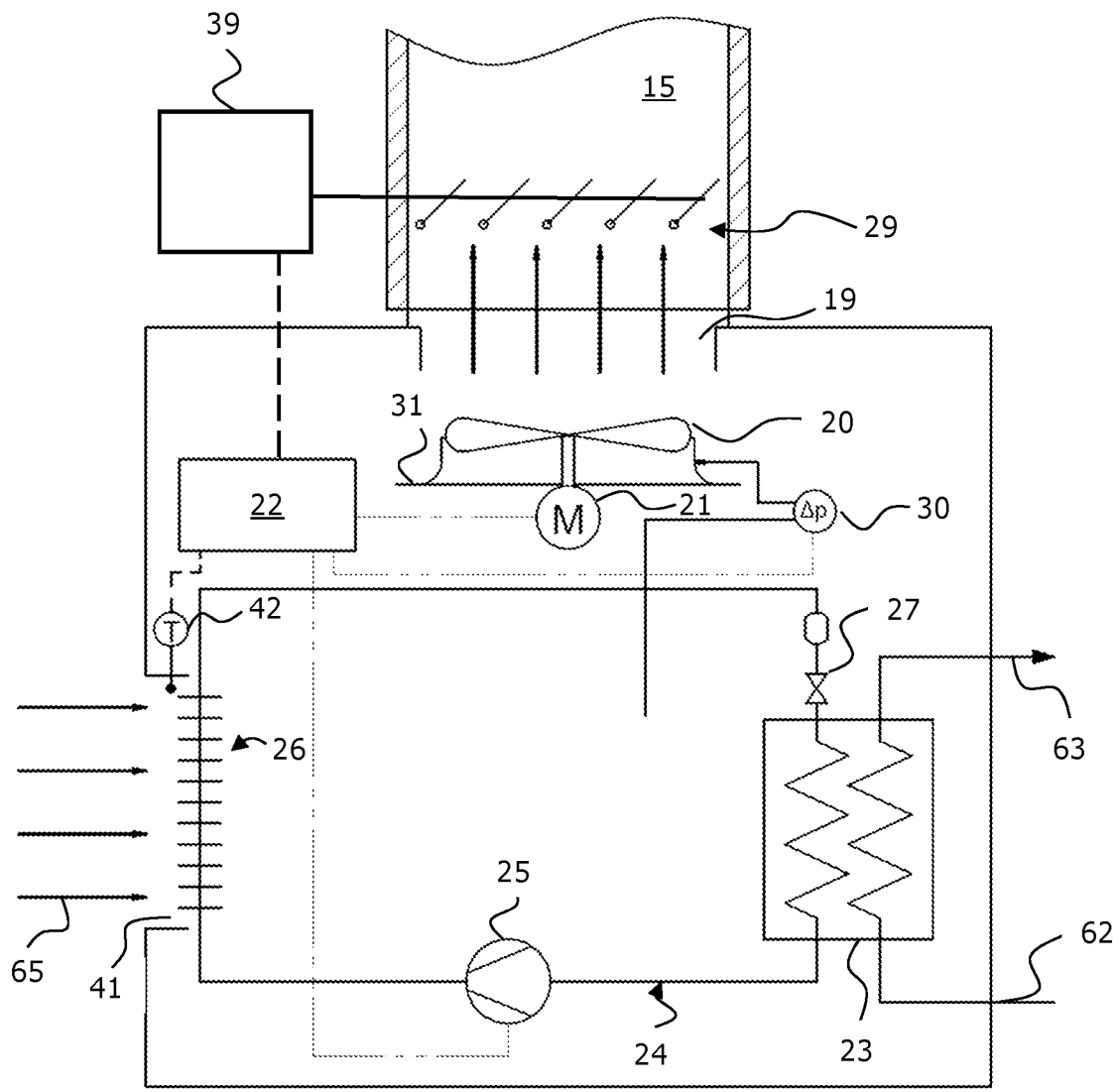
FIG. 6 shows a schematic illustration to explain the mode of operation of a refrigeration dryer according to the present invention.

The basic structure and the basic mode of operation of a refrigeration dryer 12, 12' according to the present invention will be explained in greater detail below with reference to FIG. 6. The refrigeration dryer first has a compressed air inlet 62 and a compressed air outlet 63. The compressed air flowing into the refrigeration dryer 12, 12' via the compressed air inlet 62 is cooled by a refrigerant at a compressed air refrigeration heat exchanger 23 and leaves the refrigeration dryer through the compressed air outlet 63. As is well known to a person skilled in the art, prior to flowing into the compressed air refrigeration heat exchanger 23, the compressed air is usually pre-cooled in a pre-heat exchanger, namely by the compressed air that has already flowed through the compressed air refrigeration heat exchanger 23, which is thus heated again before flowing out of the compressed air outlet 63. However, the pre-heat exchanger described above is not shown in the present case.

To provide the cooling capacity required at the compressed air refrigeration heat exchanger 23, the latter is part of a refrigerant circuit 24, which forms a compression refrigeration machine, known per se, and thus comprises, as seen in the direction of flow of the refrigerant from the compressed air refrigerant heat exchanger 23 a refrigerant compressor 25, a condenser 26 connected thereto and an expansion valve 27 downstream thereof. The gas expanded after flowing through the expansion valve 27 is cooled by the expansion process and in the compressed air refrigerant heat exchanger 23 transfers cold to the compressed air. The refrigerant compressor 25 compresses the refrigerant. The heat produced during this is output in the condenser 26 to the supply air. For this purpose, a cooling air flow 65 is conducted through the refrigeration dryer 12, 12', the supply air usually being ambient air and being sucked into the refrigeration dryer 12, 12' at a supply air inlet 41, namely under the effect of a fan 20 driven by a fan motor 21.

The cooling air flow 65 absorbs heat in the condenser 26, so that the refrigerant in the condenser 26 is cooled. According to the invention, the resulting waste heat is to be introduced via a dryer exhaust air duct 15 to an exhaust air duct 13, into which waste heat from other compressed air-generating or compressed air-processing components is also conducted. For this purpose, the dryer exhaust air duct 15 is connected directly to the cooling air outlet 19 of the refrigeration dryer 12, 12'. An exhaust air damper 29, which can be moved by way of a drive motor 39, in particular from an open position to a closed position or vice versa, interacts with a controller 22, which actuates the exhaust air damper 29 and closes or opens it as required.

However, the controller 22 also controls the fan motor 21 of the fan 20.

The fan motor 21 is speed-adjustable. A current value for the cooling air volume flow $V_{act}$ is detected within the cooling air flow 65 by a flow sensor 30. This preferably takes place in that the flow sensor 30 is designed as a differential pressure sensor and detects on the one hand the pressure within the cooling air flow 65 in the region of an inflow nozzle 31, which is arranged immediately in front of the fan 20, and on the other hand in an upstream region of the cooling air flow way before it flows into the inflow nozzle 31. From these two pressure values and the resulting pressure difference, it is possible to calculate the flow rate of the cooling air flow and thus, based on the given flow cross-section, the current volume flow. The current value of the cooling air volume flow $V_{act}$ detected by the flow sensor 30 is transmitted to the controller 22, which then actuates the fan motor 21 in such a way that, regardless of the current backpressure in the exhaust air duct 13, a respectively specified value for the cooling air volume flow $V_{soll}$ is adhered to as precisely as possible, that is to say the fan 20 is adjusted in such a way that the current cooling air volume flow $V_{act}$ follows the respectively pre-set setpoint for the cooling air volume flow $V_{soll}$.

Although the differential pressure measurement proposed here is a particularly simple, inexpensive and reliable method for determining the current cooling air volume flow $V_{act}$, the invention is of course not limited to this specific way of detecting the value of the cooling air volume flow. Instead, various other measurement techniques and methods are conceivable for detecting the current value of the cooling air volume flow.

Figure 7:
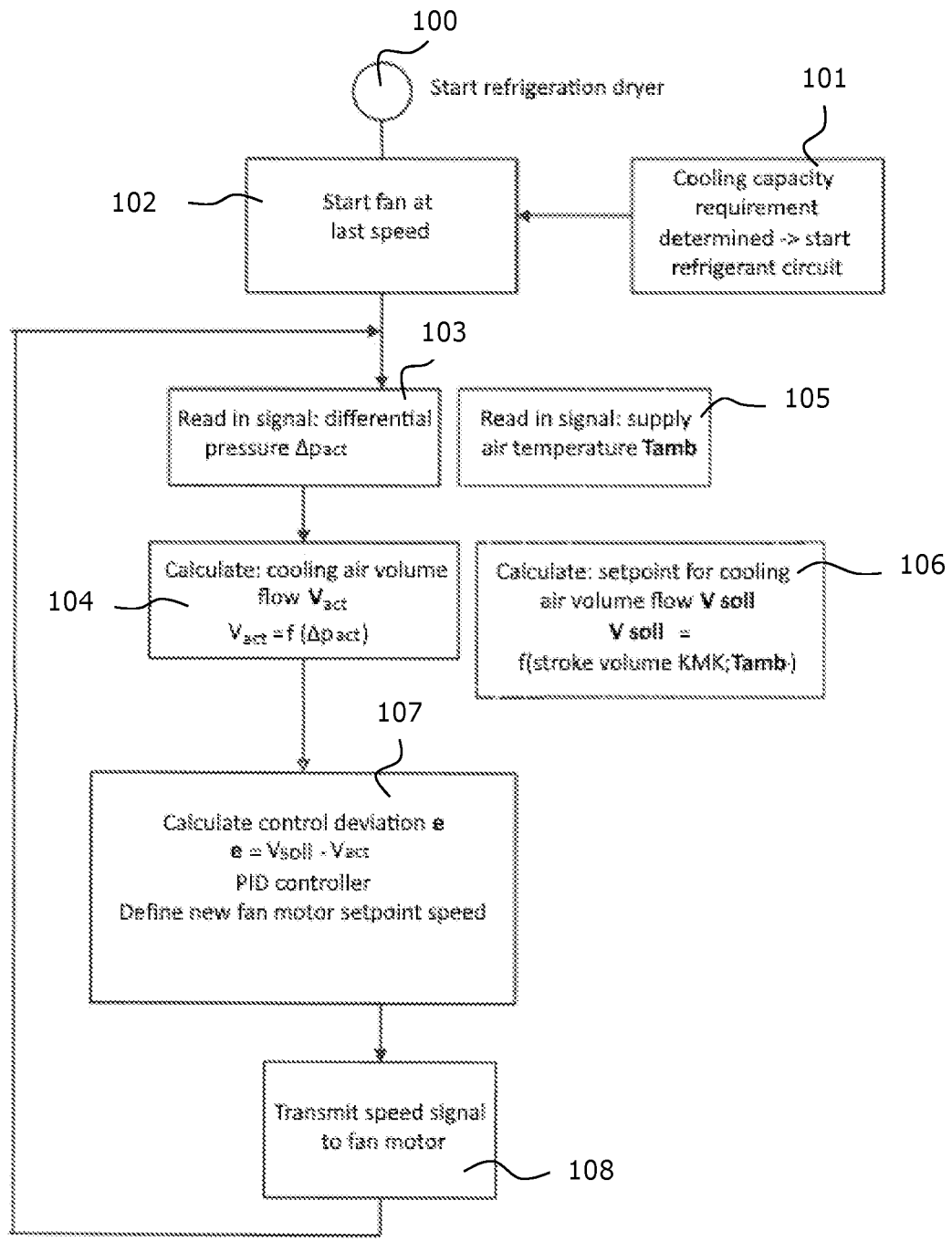
FIG. 7 shows a flowchart to explain an embodiment of the method according to the invention.

A preferred adjustment, taking into account the respective current value for the cooling air volume flow $V_{act}$, will be explained in greater detail below with reference to the flowchart shown in FIG. 7:

In a step 100, the refrigeration dryer 12, 12' is first started. In a step 101, the cooling capacity requirement is determined and the refrigerant circuit 24 is started by setting the refrigerant compressor 25 in operation. In step 102, the fan 20 is started at a specified minimum speed.

Figure 8:
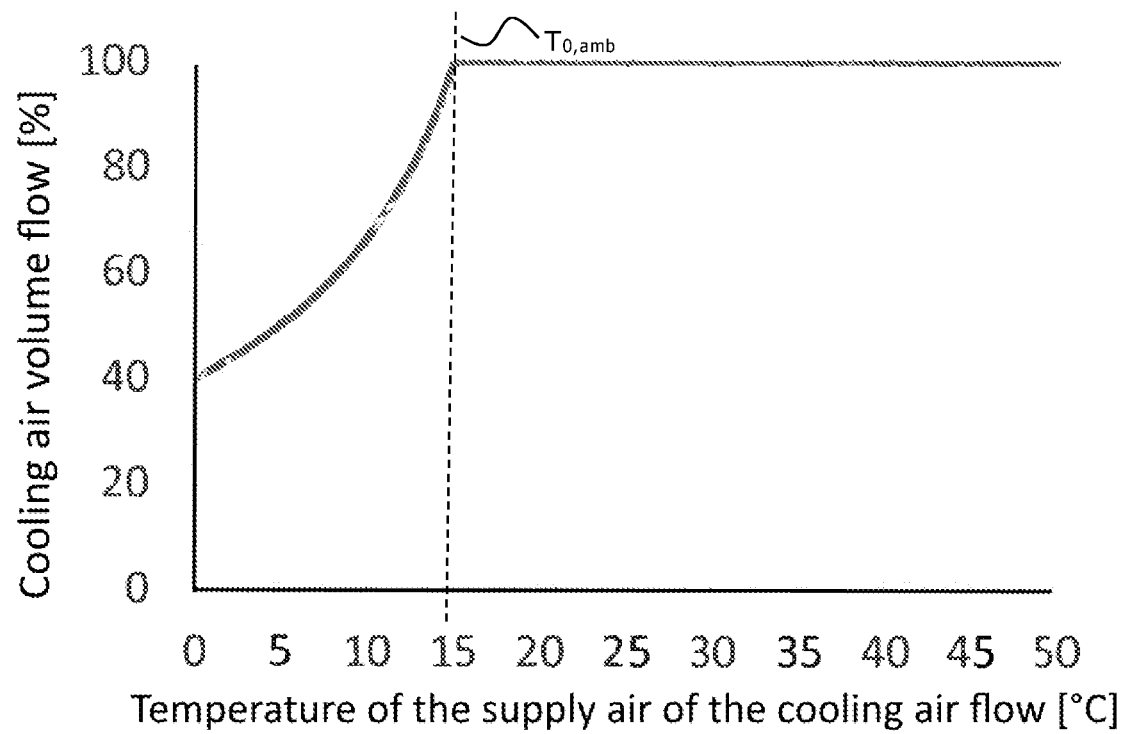
FIG. 8 shows an embodiment of a possible curve of the correction factor $F_T$ as a function of the supply air of the cooling air flow $T_{amb}$.

Then, in step 103, a current differential pressure $\Delta p_{act}$ is determined by the flow sensor 30, and in a step 104 a current cooling air volume flow $V_{act}$ is calculated from the current differential pressure $\Delta p_{act}$. In parallel with this, a setpoint for the cooling air volume flow $V_{soll}$ is defined. In the present embodiment, this takes place by first reading in a signal for the supply air temperature $T_{amb}$ in a step 105. In a step 106, a setpoint for the cooling air volume flow $V_{soll}$ is calculated, taking into account the temperature of the supply air $T_{amb}$ and optionally also a current stroke volume. Based on a design value for the cooling air volume flow $V_{nenn}$, which is specific to the given refrigerant circuit 24 with the given refrigerant compressor 25, a setpoint for the cooling air volume flow is determined according to the following formula, using two correction factors:

$$V_{soll}=V_{nenn}*F_{Hub/KMK}*F_T,$$

where the factors $F_{Hub/KMK}$ and $F_T$ are correction factors. The correction factor $F_T$ is used only in the case where the supply air temperature is below a limit temperature $T_{0,amb}$, and is otherwise set equal to 1, cf. in this regard FIG. 8, which shows an example of the curve of the correction factor $F_T$, here expressed in %, with the limit temperature $T_{0,amb}$ having been set here to 15° C. If the temperature of the supply air is below the limit temperature $T_{0,amb}$, the correction factor can be defined for example as follows:

$$F_T = \frac{\Delta_T}{T_{0,amb} - T_{amb,act}}.$$

The correction factor for the stroke volume can be calculated according to the following formula:

$$F_{Hub/KMK} = \frac{\text{current stroke volume } KMK}{\text{maximum stroke volume } KMK}.$$

In a step 107, the current cooling air volume flow $V_{act}$ is compared with the setpoint for the cooling air volume flow defined in step 106, and the difference between $V_{soll}$ and $V_{act}$ is formed, this difference defining a control deviation e. The fan 20 is then actuated in such a way that the cooling air volume flow $V_{act}$ follows the specified setpoint for the cooling air volume flow $V_{soll}$, namely in that, in step 108, a current speed signal is transmitted to the fan motor 21 for the fan 20. The method then begins again at step 103 or 105, at a predefined sampling rate of, for example, 100 ms.

REFERENCE SIGNS

11, 11' screw compressor
12, 12' refrigeration dryer
13, 13' exhaust air duct
14, 14' compressed air line
15 dryer exhaust air duct
16 refrigeration dryer connection
17 compressor connection
18 cooling air outlet (screw compressor)
19 cooling air outlet (refrigeration dryer)
20 fan
21 fan motor
22 controller
23 compressed air refrigeration heat exchanger
24 refrigerant circuit
25 refrigerant compressor
26 condenser
27 expansion valve
28 pressure sensor
29 exhaust air damper
30 flow sensor
31 inflow nozzle
39 drive motor
41 supply air inlet
42 ambient air sensor/temperature sensor
43 further compressed air line
44 consumer
45 screw compressor exhaust air duct
46 exhaust air damper (screw compressor)
47 branching point
48 first partial line
49 second partial line
50 third partial line
51 fourth partial line
52 joining point
53 further refrigeration dryer connection
54 cooling air outlet
55 dryer exhaust air duct
56 first output line
57 second output line
58 joining point
59 cooling air outlet
60 screw compressor exhaust air duct
61 compressor connection
62 compressed air inlet
63 compressed air outlet
64 exhaust air damper
65 cooling air flow
66 first output line
67 second output line
68 joining point
69 exhaust air damper

The invention claimed is:

1. A compressed air station comprising at least two compressed air components that yield waste heat, wherein each compressed air component is designed either as a compressor or as a refrigeration dryer,
wherein at least one of the at least two compressed air components, comprises a refrigeration dryer and is connected to an exhaust air duct, and wherein the other one of the at least two compressed air components is connected to the same exhaust air duct,
wherein a compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger,
wherein the compressed air station further comprises a dryer exhaust air duct, which is provided for discharging a cooling air flow that is conducted through the refrigeration dryer, and which connects a cooling air outlet of the refrigeration dryer to a refrigeration dryer connection on the exhaust air duct,
wherein the refrigeration dryer has a fan with a speed-adjustable fan motor, and the fan is designed to convey the cooling air flow even against a backpressure currently prevailing in the exhaust air duct,
wherein the refrigeration dryer has a flow sensor for detecting a respective current value for the cooling air volume flow $V_{act}$,
and wherein the refrigeration dryer has a controller or interacts with a controller, which is configured and designed to record and process data from the flow sensor and to actuate the fan motor of the fan in such a way that, regardless of the current backpressure in the exhaust air duct, the respective current cooling air volume flow $V_{act}$ follows a setpoint for the cooling air volume flow $V_{soll}$.

2. The compressed air station according to claim 1, wherein
the flow sensor is designed as a differential pressure sensor.

3. The compressed air station according to claim 2, wherein
the flow sensor designed as a differential pressure sensor is assigned within an inflow nozzle assigned to the fan and detects the pressure prevailing there in comparison to a reference pressure.

4. The compressed air station according to claim 1, wherein
the fan of the refrigeration dryer is designed as a radial fan.

5. The compressed air station according to claim 1, wherein
a screw compressor and the refrigeration dryer are connected to one another via a compressed air line, and the compressed air line is designed to transfer the compressed air output by the screw compressor to the refrigeration dryer for drying purposes, wherein a cooling air outlet of the screw compressor is connected via a compressor connection to the exhaust air duct, to which the refrigeration dryer is also connected.

6. The compressed air station according to claim 1, wherein
the setpoint for the cooling air volume flow $V_{soll}$ is adapted as a function of a load state of the refrigerant compressor and/or as a function of the ambient temperature.

7. The compressed air station according to claim 1, wherein
a setpoint for the cooling air volume flow $V_{soll}$ results from a design value for the cooling air volume flow $V_{nenn}$, which is specific to the given refrigerant circuit with the given refrigerant compressor (25), according to the following formula:

$$V_{soll}=V_{nenn}*F_{Hub/KMK}*F_T,$$

where the factors $F_{Hub/KMK}$ and $F_T$ are correction factors, each of which can alternatively be set to 1 or to a value between 0 and 1.

8. The compressed air station according to claim 1, wherein
the controller interacts with an ambient air sensor for detecting a value representative of the state of the supply air and transmitting it to the controller.

9. The compressed air station according to claim 1, wherein
an exhaust air damper is arranged in the dryer exhaust air duct, which damper is designed and configured to close the dryer exhaust air duct when the refrigerant compressor is idle.

10. The compressed air station according to claim 9, wherein
the exhaust air damper is designed as a gravity-operated exhaust air damper, which opens whenever the fan is conveying the exhaust air through the dryer exhaust air duct and closes whenever the fan is idle.

11. The compressed air station according to claim 9, wherein
the exhaust air damper interacts with a drive motor, wherein the drive motor is actuated by the controller in such a way that the exhaust air damper is opened or closed depending on the operating state of the fan.

12. A method for actuating a fan motor of a fan of a refrigeration dryer within a compressed air station, wherein the compressed air station comprises at least two compressed air components that yield waste heat, wherein each of the at least two compressed air component is designed either as a compressor or as a refrigeration dryer, and at least one exhaust air duct for discharging waste heat from a room, wherein at least one of the at least two compressed air components comprises the refrigeration dryer and is connected to the exhaust air duct, and wherein another one of the at least two compressed air components is connected to the same exhaust air duct,
wherein a compressed air refrigeration heat exchanger is provided within the refrigeration dryer, in which the compressed air is cooled by way of a refrigerant conducted in a refrigerant circuit, wherein the refrigerant circuit comprises a refrigerant compressor, a condenser, an expansion valve and the compressed air refrigeration heat exchanger,
wherein the compressed air station further comprises a dryer exhaust air duct, which is provided for discharging from the refrigeration dryer a cooling air flow that is conducted through the refrigeration dryer, and which connects a cooling air outlet of the refrigeration dryer to a refrigeration dryer connection on the exhaust air duct, wherein the refrigeration dryer has a fan with a speed-adjustable fan motor, and the fan is designed to convey the cooling air flow even against a backpressure currently prevailing in the exhaust air duct,
wherein the method comprises:
specifying a setpoint $V_{soll}$ for the cooling air volume flow,
detecting a respective current value for the cooling air volume flow $V_{act}$, and
actuating the fan motor of the fan in such a way that the respective current cooling air volume flow $V_{act}$ follows the respectively specified setpoint for the cooling air volume flow $V_{soll}$.

13. The method according to claim 12, wherein
the respective current value for the cooling air volume flow $V_{act}$ is detected by way of a differential pressure measurement.

14. The method according to claim 13, wherein
in the differential pressure measurement a pressure is detected, relative to a reference pressure, immediately before the cooling air flow flows into the fan.

15. The method according to claim 13, wherein
the setpoint for the cooling air volume flow $V_{soll}$ results from a design value for the cooling air volume flow $V_{nenn}$, which is specified for the refrigerant circuit and the refrigerant compressors installed therein.

16. The method according to claim 13, wherein
the setpoint for the cooling air volume flow $V_{soll}$ is adapted as a function of a load state of the refrigerant compressor and/or as a function of the ambient temperature.

17. The method according to claim 13, wherein
the setpoint for the cooling air volume flow $V_{soll}$ results from a design value for the cooling air volume flow $V_{nenn}$, which is specified for the refrigerant circuit and the refrigerant compressors installed therein, taking into account one or more correction factors F.

18. The method according to claim 16, wherein
the setpoint for the cooling air volume flow $V_{soll}$ results from the design-based nominal value for the cooling air volume flow $V_{nenn}$, according to the following formula:

$$V_{soll}=V_{nenn}*F_{Hub/KMK}*F_T,$$

where $F_{Hub/KMK}$ is a correction factor for taking into account the respective current stroke volume in the refrigerant circuit, and $F_T$ is a correction factor for taking into account temperature fluctuations in the supply air of the cooling air flow, where:

$0 \leq F_{Hub/KMK} \leq 1$ and $0 \leq F_T \leq 1$.

19. The method according to claim 18, wherein
the value T is set to 1 in the case of supply air temperatures above a limit temperature $T_{0,amb}$, and:

$0 \leq F_T < 1$ applies only in the case of cooling air inlet temperature values $T < T_{0,amb}$.

20. The method according to claim 18, wherein
the correction factor $F_T$ for the cooling air inlet temperature T in ranges of the cooling air inlet temperature below the limit temperature $T_{0,amb}$ is calculated as follows:

$$F_T = \frac{\Delta_T}{T_{0,amb} - T_{amb,act}},$$

where $\Delta_T$ denotes a dryer-specific supplement in ° C., $T_{0,amb}$ denotes a fixed limit temperature, and $T_{amb,act}$ denotes the current supply air temperature.

21. The method according to claim 15, wherein
the correction factor $F_{Hub/KMK}$ is formed from a ratio of the current stroke volume and of the maximum stroke volume in the refrigerant circuit, according to the following formula $$F_{Hub/KMK} = \frac{\text{current stroke volume } KMK}{\text{maximum stroke volume } KMK}.$$

22. The method according to claim 12, wherein
a PID controller, a PI controller, a deadband controller or a three-point controller is used to actuate the fan motor of the fan (20) in order to bring $V_{act}$ towards $V_{soll}$, wherein a control deviation e results from $V_{soll} - V_{act}$, and wherein $V_{soll}$ denotes the setpoint for the cooling air volume flow and $V_{act}$ denotes the current cooling air volume flow.

* * * * *